United States Patent

Spurney

[15] 3,685,887

[45] Aug. 22, 1972

[54] INDIRECT OPHTHALMOSCOPE
[72] Inventor: Robert V. Spurney, 2659 Eaton Road, University Heights, Ohio 44118
[22] Filed: Sept. 28, 1970
[21] Appl. No.: 76,225

Related U.S. Application Data

[63] Continuation-in-part of Ser. No. 769,695, Oct. 22, 1968, abandoned.

[52] U.S. Cl. ..................351/6, 350/297, 351/13, 351/16
[51] Int. Cl. ..............................................A61b 3/12
[58] Field of Search ...........351/6, 7, 13, 16; 350/297

[56] References Cited

UNITED STATES PATENTS 2,505,505  4/1950  Sachtleben ............350/297 X
2,940,358  6/1960  Rosenthal..............350/297 X

OTHER PUBLICATIONS

Bausch & Lomb Optical Co., Scientific & Technical Pub. " Large Gullstrand Ophthalmoscope ... ", 1915
Archives of Ophthalmology, " The Upright Fundus Image ... ", pp. 67– 70, Vol. 77, Jan. 1967

*Primary Examiner*—David Schonberg
*Assistant Examiner*—Paul A. Sacher
*Attorney*—Ely, Golrick & Flynn

[57] ABSTRACT

A compact indirect ophthalmoscope, adapted to handheld or mounting support, with a prefocused direct line illumination system, has an observing system including a right dihedral angle, semi-silvered beam-splitting and image erecting mirror interposed symmetrically in and with dihedral edge at 45° angle to the beam axis to intercept and rotate at right angles the cone of rays diverging from the eye, providing by the observation system objective lens arrangement a large erect real aerial image of an extensive fundus area, suitable for binocular and stereoptic observation by an appropriate known form of loupe, if desired, and also affording substantially simultaneous observability of the fundus image, pupil and eye exterior; means being provided to suppress or eliminate from the aerial image corneal and other reflections. A second form utilizes a planar beam-splitting mirror to turn the convergent illuminating rays through a right angle and thence into the eye, emergent rays from the eye passing back through the mirror, the objective lens and then encountering a dihedral mirror erecting and directing the image toward a desired angle of observation.

13 Claims, 5 Drawing Figures

INVENTOR.
ROBERT V. SPURNEY
BY
*Ely and Golrick*
ATTORNEYS

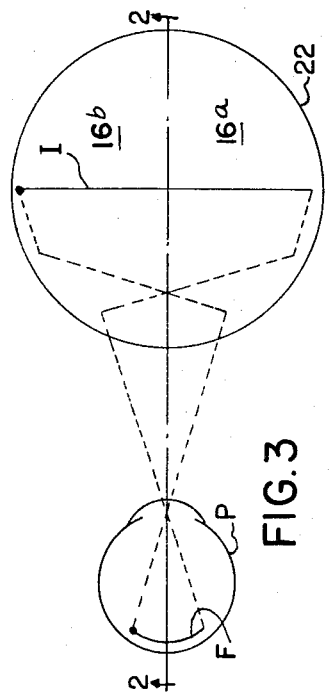
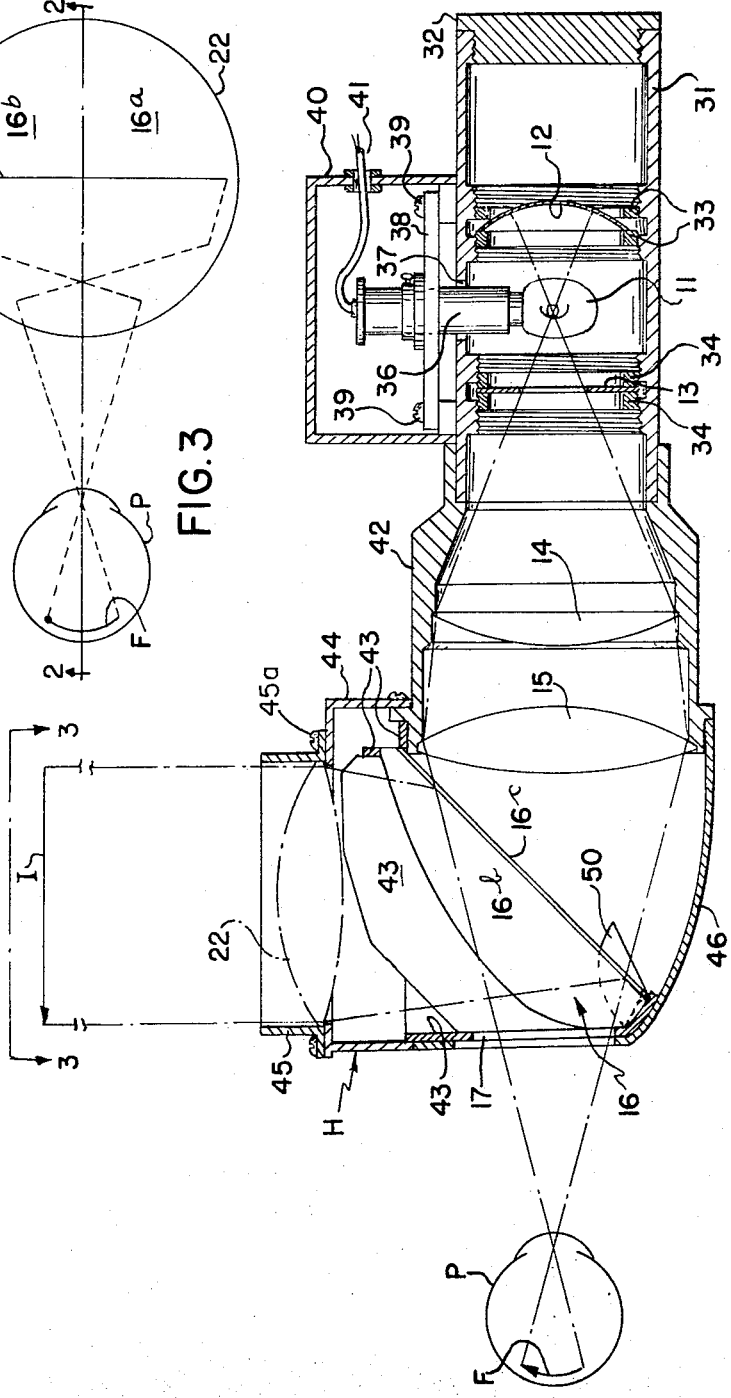

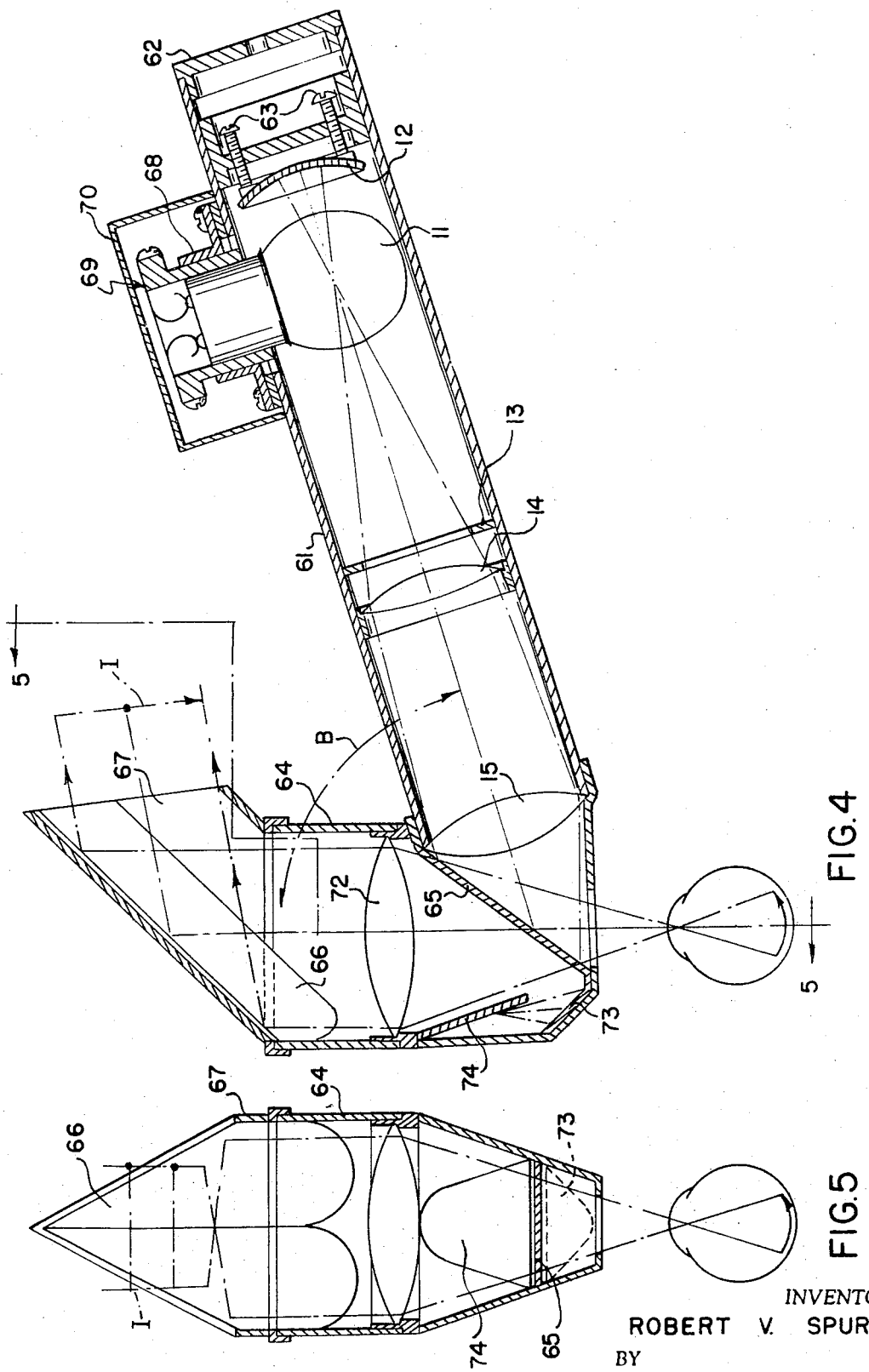

INDIRECT OPHTHALMOSCOPE

This application is a continuation-in-part of the copending application, Ser. No. 769,695 filed Oct. 22, 1968, and now abandoned.

Indirect ophthalmoscopes of the prior art, at least as known to the inventor herein, have been burdened with one or more of various disadvantages affecting the convenience of, or in some cases limiting the extent of circumstances of, use by the ophthalmologist. Among these are the presentation of an inverted image of the portion of the fundus being observed; the occurrence of annoying reflexes from the biconvex condensing lens of the illuminating-observing system intercepting the aerial image; obstruction of direct observation of the external eye portions while the fundus is being observed; formation of a small aerial image, when the image is upright; non-suitability in some instances, for binocular observation and stereopsis; while in some instruments, the illuminating beam is not pre-focused, resulting in distortion of the conjugate focus at the entrance pupil of the eye and uneven illumination of the fundus. Further, especially objectionable where the instrument is being used in surgery, certain types of indirect ophthalmoscopes have been unduly bulky or heavy; or easily contaminated by the surgeon.

It is the general object of the present invention to provide an improved form of indirect ophthalmoscope wherein one or more of the aforementioned disadvantages may be eliminated.

Another object is the provision of an indirect ophthalmoscope which is adaptable to ready sterilization, for example, by gas, which may be placed on the instrument table in surgery, and the use of which does not involve an inherent risk of contamination of the operating field.

Another object is the provision of an instrument relatively compact, light and simple in construction and maintenance.

Another object is the provision of an indirect ophthalmoscope which provides a real and erect large image of an extensive area of the fundus, for example.

A further object is the provision of an indirect ophthalmoscope in which the image is substantially "reflection-less."

A still further object is the provision of an indirect ophthalmoscope which avoids extreme proximity to the eye, and which allows approximately simultaneous direct observation of the exterior of the eye as well as the characteristic indirect observation of the eye interior or fundus.

Other objects and advantages of the invention will appear from the following description and the drawings wherein:

FIG. 1, with one form of instrument embodying the invention shown in solid lines and with the hands of the user and the head of the patient in dashed outline, is representative of the manner of use of an instrument in accordance with the invention, where the instrument is hand-held rather than supported on an adjustable mount;

FIG. 2 is a vertical axial section taken as indicated by the lines 2—2 for the instrument of FIG. 1;

FIG. 3 is a schematic representation of the path of the rays from the fundus of the eye to a real erect aerial image fixed in space, projected onto a plane as where the optical system is considered as viewed as indicated by the view line 3—3 in FIG. 2;

FIG. 4 shows a modified or second form of instrument embodying certain features of the invention in a vertical longitudinal axial section, taken similarly to that of FIG. 2; and FIG. 5 is a vertical section through the optical system of the embodiment of FIG. 4 taken substantially as indicated by the line 5—5 in FIG. 4, though somewhat irregularly for purposes of clarity of representation.

Figure 1:
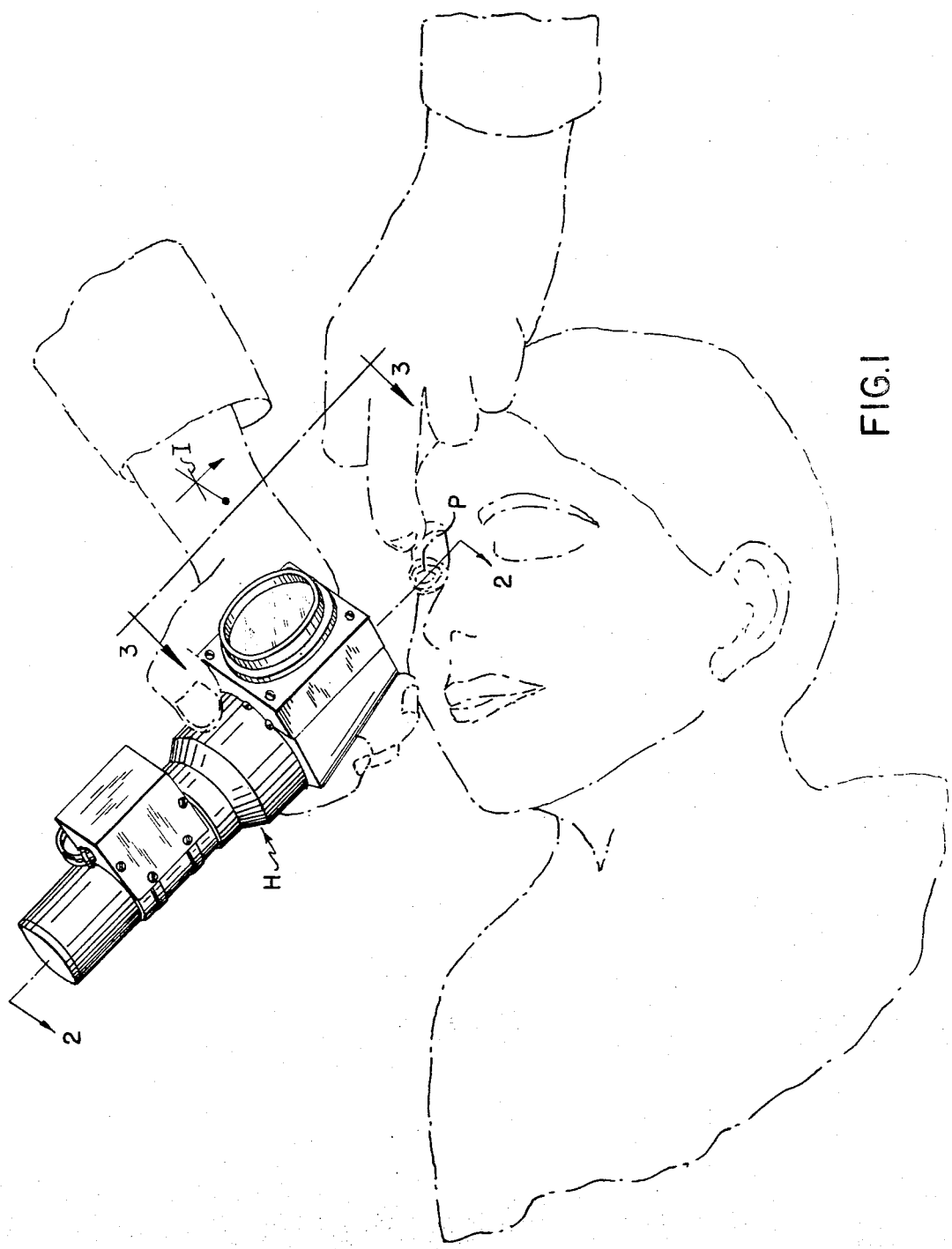

The form of the indirect opthalmoscope represented in FIGS. 1–3, first as an illumination system, includes coaxially arranged in the housing H, the filament of a low voltage, high intensity miniature lamp 11, preferably a miniature type, in conjunction with a concave mirror 12; an aperture disc 13, here shown as a fixed aperture rather than an adjustable iris type diaphragm aperture; a condensing lens system including lenses 14 and 15; and a beam-splitting semi-silvered mirror 16 forming as well a part of the optical or observation system hereinafter described. The light is projected along a straight axis essentially coaxial with the main portion of the housing H out a working end optical opening 17 and through the pupillary aperture of the patient's eye P being observed, onto fundus F, being essentially focused at the plane of the pupillary aperture to diverge sharply within, and illuminate extensively, the eye interior.

The cone of light rays leaving the pupillary aperture along the axis of the illuminating system and re-entering the end opening 17 of the instrument encounters the front reflecting surfaces of the mirror 16 being thereby turned through 90° to pass through the objective lens 22 and form the real fixed erect aerial image I.

The mirror 16, which in conjunction with the lens 22 provides the optical system, is in the form of a right dihedral angle mirror, the dihedral faces being comprised of two plane plates of semi-silvered transparent material or glass assembled in a 90° dihedral angle with the front faces, that is, opposed faces being the semi-silvered surfaces. The axis of the illuminating system passes through the dihedral edge and lies in the dihedral bisecting plane. Though the dihedral edge is here shown disposed at an angle of 45° to the illuminating system axis, it is to be understood that it can be disposed at some other angle as may be desired in order to rotate the path of projection of the image to some other angle than 90° to the illuminating axis.

In the smaller diameter tubular housing portion 31, closed at one end by screwed plug 32, the mirror 12 and aperture disc 13 are secured in proper coaxial positions by respective pairs 33, 34 of bezel-like male threaded ring elements engaged in female threads formed on the tube interior, and affording some degree of axial adjustment. The socket 36 for lamp 11, projecting through a tube slot at 37 is adjustably supported on a preferably insulating plate 38 secured by screws 39 passed through elongated plate screw slots into the tube body, for axial positioning of the filament; a lamp housing 40, covering the lamp socket base plate, being in turn secured to the tubular body portion by suitable fasteners such as screws. Ventillating apertures (not shown) are provided in 40, as well as an insulating grommet for the lamp power cord 41 going to a source of power such as a rheostat control associated with the instrument for brightness control, interposed in the line to the service power outlet.

Tubular portion 31 is received and screw-secured in the back of the enlarged housing portion 42, in successive counterbored portions of which the condensing lenses 14 and 15 are secured in fixed axial spacing by press-fitted bezels, by cementing or other suitable means. A rectangular frame element 44 secured on the top of and projecting forwardly from 42 supports the mounting flanged collar 45 of the objective lens 22, securement by screws 45a through oversize holes in the collar flange enabling precise positioning of the lens coaxial with the viewing leg or axis of the optical system. A formed enclosure shell 46 screw-secured to the downward skirt of frame 44 defines with 44 and 42 an enclosure for mirror 16 mounted therein by the cradle-like stamping 43; and as well defines the opening 17.

On the interior surfaces of the various housing components 31, 32, 42, 44, 45, 46 there is applied one of the many known light absorbing finish coatings; and preferably anti-reflection coated lenses are used.

For convenience of reference and description, the two angularly disposed intersecting arms of the housing from the collar 45 to the mirror on the one hand and, on the other, from the end plug 32 to the mirror, in the above described embodiment, and the corresponding arms of the next described embodiment may be termed herein observation system tube and illumination system tube.

FIG. 3, in schematic form, shows more clearly the manner in which the observation system erects the fundus image, as well as turning the "plane" of the image at an angle (here at 90° for the 45° inclination to the illumination axis of the dihedral edge 16c formed between the plane mirror faces 16a, 16b) to the "plane" of the fundus. In FIG. 3 the observed portion of the fundus and the corresponding image are represented by a knobbed arrow to distinguish from the representation of FIG. 2 since the latter is a section taken at right angles to the plane of FIG. 3.

By way of example, to provide a pre-focused beam, with a plano-convex lens having a 43 mm diameter and 92 mm focal length as lens 14 spaced approximately 22 mm (optical center to optical center) from a biconvex lens 15 having 48 mm diameter and 50 mm focal length, and the lamp filament center approximately 52 mm behind lens 14, the illuminating beam is brought to a focus 80 mm from the center of lens 15, at a point about 35 mm from the working end of the housing having opening 17. The biconvex objective lens 22 being 51 mm in diameter with a focal length of 83 mm, the image I appeared in space, of course, at approximately (since variable with refractive error of the eye observed) 83 mm from the center of the objective; the magnification being about 5X.

The concave mirror 12 having a 22 mm radius of curvature, correspondingly center-spaced 22 mm from the filament of lamp 11, effectively intensifies the illuminating beam; and it is found that a 6.5 volt and 2.75 ampere rated General Electric miniature type lamp, operated well below its rated voltage so that the instrument is relatively cool and therefore comfortable, provides excellent illumination of the eye interior. The focusing of the light as a homogeneous strongly convergent beam through a small area of and at the plane of the pupillary aperture results in a sharply divergent cone of light within the eye intensely and diffusely illuminating a large retinal or fundal area.

An instrument having substantially the construction of FIGS. 1–2 is obviously compact having a length of about 18 cm. By virtue of the space (30–35 mm for the lenses above described in the illuminating and observation optical systems) between the windowed end of the instrument and the cornea of the observed eye P when the illumination beam focus point is brought into the plane of the pupillary aperture, in conjunction with the formation of the retinal image well removed from the instrument, the user can readily and conveniently observe the pupil and the exterior of the eye as well as the fundus image practically simultaneously. This is especially useful in surgery, since interior light transmitted through the sclera is seen on the exterior, aiding location of retinal pathology and the direction of treatment or surgical procedures. The working spacing thus provided further is advantageous as the instrument may be readily and conveniently positioned to direct the illumination, and therefore axis of viewing aim, through the pupillary aperture quite obliquely to the optical axis of the eye, and accordingly to afford good observation of the periphery of the fundus. Especially conducive to the latter end is the occupation of only a small area of the pupillary aperture by the beam.

In this form of instrument the separation of the lenses of the illuminating system from the observation system, i.e., the fact that the objective lens 22 forms no part of the illuminating system, prevents reflections from the lenses of the latter from affecting or appearing at the image to be observed.

The beam reflections from the cornea, moreover, image at locations displaced from the area over which the fundus image is formed so that by appropriate positioning of the observer's pupils these reflections do not interfere with observation. Or conversely stated, by positioning the observer's pupils so as to be imaged by the objective lens at positions of the patient's pupil well spaced from the beam, corneal reflections do not affect the image. Also corneal reflexes may be eliminated by adjusting the beam position and the angle of observation.

By the foregoing means the objectionable reflexes can be so minimized as to be for practical purposes eliminated, though known polarizing means may be included in the illumination system, e.g., Polaroid sheet located in front of lens 15 and above objective 22, though such sheet as currently available entails a loss of light by absorption which is excessive for many uses of the instrument.

To the extent that reflection from the outside faces of the dihedral mirror might desirably be further suppressed, respective like mirror and light trap means may be used, symmetrically located on opposite sides of the longitudinal plane of symmetry of the instrument defined by the intersecting illumination and observation system axes. Each mirror 50, mounted on the housing shell portion 46 at the forward front lower end of and laterally of the right angle mirror 16, intercepts, reflects upwardly and focuses the light into a light trap formed by the respective outwardly upwardly sloping bottom face of the mirror supporting cradle 43.

The right dihedral angle mirror, even apart from other considerations, because of lighter weight, is considered preferable to an Amici roof prism for erecting purposes; while its location as represented, where it may serve also as a beam splitting device, offers the further advantage of compactness as compared to use of a plane beam splitting mirror with the dihedral located thereabove, e.g., above objective lens 22.

Though fiber light guide means could be used in place of the local light source, this is not necessary in an instrument of general utility, in view of the general compactness, relatively low weight and cool operation of the instrument as shown.

The form of the instrument being such that it may be fabricated in light weight, it is easily manipulated by a single hand, but, of course, an adjustable mechanical stand frees both hands of the user to great advantage in surgery. For increased magnification, though with decreased field, a known form of suitable magnifying loupe may be used.

It should also be noted that, since as indicated in FIG. 1 and the aforegoing description the image is formed at an appreciable distance from the instrument and is observable from a point still further removed, danger of contamination by the user of a sterilized instrument placed upon the operating field is substantially eliminated.

In the instrument of FIGS. 4–5, again the concave mirror 12, filament of lamp 11, the aperture disc 13, and the condensing system lenses, the back biconvex lens 14 and biconvex front lens 15 are appropriately mounted coaxially of an elongated tubular metal housing portion 61 serving as the instrument handle, from which projects a lamp support housing structure. The handle tube at the back is closed by a removable plug 62 providing access to mirror adjusting screws 63; and at the front joins at an acute angle B a short cross tubular portion 64 of somewhat larger diameter in which is centered a flat beam splitting semi-silvered mirror 65 set at an angle (equal to B/2) to the axis of the condensing lens system to turn the illuminating beam down the axis of the observation system tube 64 for focusing at a point conveniently brought to the plane of the pupillary aperture for interior eye illumination in the manner previously described.

The lamp support and structure comprises merely a flanged collar 68 defining a lamp insertion opening, in which is set screw secured the lamp socket 69 having terminals for a power cord (not shown) extending through the removable cover 70.

In this case the light reflected back out through the pupillary aperture in a divergent cone passes through plane mirror 65, and through the objective lens 72 within the cross tube 64 just above the top end of the beam-splitting type mirror 65, to be intercepted by a right dihedral angle inverting mirror 66 mounted on the top of the cross tube. The dihedral bisecting plane includes the observation optical axis and the dihedral edge is inclined at an angle less than 45° to that axis, e.g., here 40°, so that, convenient for viewing, an erected image may be viewed along an axis at 80° to the axis of tube 64. The mirror 66 with its enclosing shroud 67 is rotatably mounted on the top end of the cross tube for viewing from various azimuthal directions as may be desired.

Again the housing interior surfaces are finished and the lenses coated to minimize reflections; and illuminating light transmitted through rather than reflected downwardly by mirror 65 may be intercepted and reflected by a mirror 73 to focus such light on the back of the light "baffle" plate 74 obliquely dependently mounted in the cross tube at 74 to form a light trap.

Here as in the first modification, the lens of the observation system, rather than being located in the alternative position, i.e., the common path portion of the systems as at the housing opening through which the illuminating beam is projected, is in the preferred location above the beam-splitting type mirror, where it does not form a part of the illuminating system; though with appropriate lens treatment there may be little preference as to either position.

It should be noted in any event that the great advantage of the image erecting dihedral mirror on the observation system axis, whether the latter be straight or "bent" as described, is also of consequence where the illumination beam is so directed as to miss any mirror in the instrument. Thus, for example, the illumination system may simply direct the illumination beam past one side of rather than through a mirror at the intersection joining region of the observation and illumination system tubes with the housing region about such mirror appropriately sized or shaped therefor; or may send divided portions of the illuminating light beam past each side of such mirror; with light guide means also useful for such purposes.

I claim:

1. An indirect viewing ophthalmoscope, for viewing the interior of an eye having a fundus, comprising, a light compact housing structured to be hand-held and providing
  an illumination system tube and
  an observation system tube rigidly and angularly joined to the illumination tube,
  with the axes of said tubes angularly disposed to each other substantially to intersect within the housing,
  and having a housing working end defined by the region of joining of said illumination and observation system tubes and provided with a first housing opening through which the axis of one of said systems is extended out of the housing in a straight line beyond the point of substantial intersection of the tube axes;
reflecting means including
  mirror means supported in the housing in the region of joining of said tubes and of the intersection of said axes and angularly disposed to the other of said system axes at such angle that the latter axis is in effect turned to extend through said first opening;
an illumination system in the illumination system tube, including light source means, providing a beam of strongly convergent illuminating rays
  projected, along a path extended beyond said mirror means, through said first opening,
  said illumination system further including means for pre-focusing the filament image of said light source means at a point on the order of 3 ½ cm from the said housing working end, said beam thus projectable through the pupillary aperture upon the fundus of an eye with free working space left between the eye and said working end of the housing;

an observation system
including a second housing opening with the axes of the observation system and tube extending therethrough and objective lens means coaxial with the observation system axis, the last said means including at least one lens located on the observation system axis between said mirror means and a said housing opening, and said objective lens means focusing rays reflected from the fundus and projected through the second said opening to form exteriorly of the housing a magnified space image of the fundus;
and
said reflecting means including dihedrally right angularly disposed reflective surfaces forming a dihedral edge intersected by the observation system axis and intercepting and reflectively inverting said reflected rays;
whereby an erect spatial image is formed for observation.

2. An opthalmoscope as described in claim 1, wherein
said system axes are substantially coplanar and intersecting at an intersection point within said housing, and
said mirror means comprises a beam-splitting type semi-silvered mirror having an operative reflecting surface intersecting said intersection point.

3. An opthalmoscope as described in claim 2, wherein
said one lens is located in the observation system tube between said semi-silvered mirror and the housing second opening.

4. An ophthalmoscope as described in claim 2, wherein
the turned axis is the observation system axis, and
said reflecting means consists of a semi-silvered right dihedral angle mirror
with dihedral edge in the plane of said axes and the right angle opening forwardly toward the first and also upwardly toward the second housing openings,
thereby to provide both the said beam splitting mirror and the said reflective surfaces.

5. An ophthalmoscope as described in claim 4 with
said objective lens means disposed on a portion of the observation system axis extending from said dihedral mirror through the second said opening.

6. An ophthalmoscope as described in claim 5 including
mirror and light trap means symmetrically disposed on opposite sides of the plane of said system axes,
the last said means including a respective mirror disposed externally of the dihedral mirror in position and at an angle to receive and direct into a light absorbing trap region light reflecting from the back face of a respective dihedral mirror back face.

7. An ophthalmoscope as described in claim 4 wherein,
said illuminating system includes
a miniature high intensity lamp with a small practically point-approximating light source filament, said lamp adjustably mounted in the illumination system tube for bringing the filament into coincidence with the illumination system axis;
a converging lens system in the illumination system tube between said lamp and said mirror; and
an apertured disk disposed coaxially in the last said tube between said lamp and said lens system to pass only a cone of such illuminating light rays originating at said filament as will pass along lines extending from said filament to the proximate face of said lens system.

8. An ophthalmoscope as described in claim 2 wherein
said beam-splitting mirror is a plane mirror.

9. An ophthalmoscope as described in claim 8 with the first said housing opening and said objective lens means coaxial relative to a common straight line as the observation system axis.

10. An ophthalmoscope as described in claim 9 wherein
said plane mirror is disposed between said first opening and said objective lens means.

11. An ophthalmoscope as described in claim 9 wherein
said angularly disposed reflective surfaces are provided by a right dihedral angle mirror disposed across that portion of the observation system axis extending away from the plane mirror toward the said second opening of the housing, thereby to turn the observation system axis and the direction of external projection of the spatial image.

12. An ophthalmoscope as described in claim 11 with said dihedral angle mirror rotatably mounted on said housing with axis of rotation coincident with that portion of the observation system axis extending from the said plane mirror toward the said dihedral angle mirror.

13. An indirect viewing ophthalmoscope, for viewing the interior of an eye having a fundus, comprising:
a light, compact housing structured to be hand-held including
an illumination system tube forming a grip for the housing, and
an observation system tube rigidly and angularly joined to the illumination tube,
with the axes of said tubes angularly disposed to each other substantially to intersect within the housing,
the axis of said illumination system extending in a straight line beyond a point of substantial intersection of the tube axes through a housing optical opening in the housing region of joining of said illumination and observation system tubes thereby defining a housing working end;
an illumination system in the illumination system tube, including light source means remote from said working end, and lens means interposed between said point of intersection and source means,
providing a beam of strongly convergent illuminating rays projected along the illumination system axis through said opening,
said illumination system pre-focusing the filament of said light source means at a point on the order of 3 ½ cm beyond the said housing working end,
said beam thus projectable through the pupillary aperture upon the fundus of an eye with free working space left between the eye and said working end of the housing;

an observation system
including a second housing opening provided by the observation system tube remote from the said point of intersection and having with the axes of the observation system and tube extending therethrough; and
reflecting means including
semi-silvered right dihedral mirror means supported and enclosed in the housing region of joining of said tubes and angularly disposed to the said system axes at such angle that the observation system axis is in effect turned to extend through the first said housing opening;
said observation system including objective lens means coaxial with the observation system axis, with at least one lens located between said mirror means and said second opening, and said objective lens means focusing rays, reflected from the fundus to said mirror and by said mirror means reflected through the second said opening, to form exteriorly of the housing a magnified space image of the fundus;
said reflecting means having right dihedrally angularly disposed reflective surfaces, meeting in a dihedral edge intersected by the observation system axis, to intercept and reflectively invert said reflected rays,
whereby an erect spatial image of the fundus is formed for observation.

* * * * *